United States Patent
Litvinov et al.

(10) Patent No.: US 6,987,637 B2
(45) Date of Patent: Jan. 17, 2006

(54) MAGNETIC RECORDING SYSTEM WHICH ELIMINATES SKEW ANGLE EFFECT

(75) Inventors: Dmitri Litvinov, Pittsburgh, PA (US); Sakhrat Khizroev, Pittsburgh, PA (US); Roy Wallace Gustafson, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 335 days.

(21) Appl. No.: 09/916,105

(22) Filed: Jul. 26, 2001

(65) Prior Publication Data

US 2002/0015253 A1   Feb. 7, 2002

Related U.S. Application Data

(60) Provisional application No. 60/221,494, filed on Jul. 27, 2000.

(51) Int. Cl.
  *G11B 20/20*  (2006.01)
  *G11B 5/596*  (2006.01)

(52) U.S. Cl. .................................. 360/76; 360/78.04
(58) Field of Classification Search ................ 360/75, 360/76, 78.01, 78.04, 78.08
  See application file for complete search history.

(56) References Cited

U.S. PATENT DOCUMENTS

| | | | |
|---|---|---|---|
| 3,943,566 A | 3/1976 | Brock et al. | |
| 4,330,807 A | 5/1982 | Lemke | |
| 4,404,609 A * | 9/1983 | Jones, Jr. | 360/126 |
| 4,652,956 A | 3/1987 | Schewe | |
| 4,731,157 A | 3/1988 | Lazzari | |
| 4,839,761 A | 6/1989 | Gatzen | |
| 4,902,971 A | 2/1990 | Guzik et al. | |
| 4,945,427 A * | 7/1990 | Cunningham | 360/75 |
| 5,029,030 A | 7/1991 | Luecke | |
| 5,073,836 A | 12/1991 | Gill et al. | |
| RE33,949 E | 6/1992 | Mallary et al. | |
| 5,225,953 A | 7/1993 | Wada et al. | |
| 5,495,379 A | 2/1996 | McNeil et al. | |
| 5,513,056 A | 4/1996 | Kawasaki et al. | |
| 5,537,273 A | 7/1996 | Hendriks et al. | |
| 5,615,063 A | 3/1997 | Kuroki et al. | |
| 5,724,212 A * | 3/1998 | Mallary et al. | 360/76 X |
| 5,801,908 A * | 9/1998 | Akiyama et al. | 360/106 |
| 5,835,299 A | 11/1998 | Lee et al. | |
| 5,986,847 A | 11/1999 | Le et al. | |
| 5,995,341 A * | 11/1999 | Tanaka et al. | 360/125 |
| 6,008,962 A | 12/1999 | Le et al. | |

(Continued)

*Primary Examiner*—Andrew L. Sniezek
(74) *Attorney, Agent, or Firm*—Robert P. Lenart, Esq.; Alan G. Towner, Esq.; Pietragallo, Bosick & Gordon LLP

(57) ABSTRACT

A perpendicular magnetic recording system is provided which eliminates unwanted side writing to adjacent recording tracks due to the skew angle effect. The system includes a perpendicular magnetic recording head with a write pole that is used to sequentially write to adjacent tracks of a magnetic recording disk. In one embodiment, the write pole is aligned at a compensation angle with respect to the recording tracks which remains greater than zero as the recording head travels in an arc across the disk. When the recording head moves radially inwardly or outwardly across the tracks of the disk, the compensation angle remains greater than zero. Any side writing by the write pole to adjacent tracks is eliminated as the write pole sequentially writes to the next adjacent track. By eliminating the skew angle effect, smaller spacings may be provided between adjacent tracks, thereby increasing data storage densities.

11 Claims, 4 Drawing Sheets

U.S. PATENT DOCUMENTS 6,021,024 A    2/2000  Akiyama et al.
6,504,675 B1 * 1/2003  Shukh et al. ............... 360/125

2002/0131203 A1    9/2002  Litvinov et al.
2003/0197968 A1 * 10/2003  Sacks et al. .................. 360/75

* cited by examiner

MAGNETIC RECORDING SYSTEM WHICH ELIMINATES SKEW ANGLE EFFECT

CROSS REFERENCE TO RELATED APPLICATION

This application claims the benefit of U.S. Provisional Patent Application Ser. No. 60/221,494 filed Jul. 27, 2000.

FIELD OF THE INVENTION

The present invention relates to perpendicular magnetic recording systems, and more particularly relates to a recording system that reduces or eliminates unwanted skew angle effects.

BACKGROUND INFORMATION

Perpendicular magnetic recording systems have been developed for use in computer hard disk drives. A typical perpendicular recording head includes a trailing write pole, a leading return or opposing pole magnetically coupled to the write pole, and an electrically conductive magnetizing coil surrounding the yoke of the write pole. The bottom of the opposing pole has a surface area greatly exceeding the surface area of the tip of the write pole.

Conventional perpendicular recording media typically include a hard magnetic recording layer and a soft magnetic underlayer which provide a flux path from the trailing write pole to the leading opposing pole of the writer. To write to the magnetic recording media, the recording head is separated from the magnetic recording media by a distance known as the flying height. The magnetic recording media is moved past the recording head so that the recording head follows the tracks of the magnetic recording media, with the magnetic recording media first passing under the opposing pole and then passing under the write pole. Current is passed through the coil to create magnetic flux within the write pole. The magnetic flux passes from the write pole tip, through the hard magnetic recording track, into the soft underlayer, and across to the opposing pole.

Perpendicular recording designs have the potential to support much higher linear densities than conventional longitudinal designs, especially when a bilayer perpendicular media with a soft magnetic underlayer is used. Magnetization transitions on the bilayer recording disk are recorded by a trailing edge of the trailing pole and reproduce the shape of the trailing pole projection on the media plane. However, due to the change in skew angle as the recording head travels in an arc across the disk and possible misalignment of the write pole, this can result in unwanted side writing when a rectangular shaped write pole is used.

A possible solution to the skew angle problem is to change the track pitch. For example, if the pole length is equal to 0.7 micron and the skew angle is 15 degrees, the head covers a radial width of 0.17 micron. If the track width is 0.1 micron, allowing 20 percent for track misregistration, the track pitch will have to be 0.2 micron vs. 0.12 micron in the case of zero skew-angle. Such an increased track pitch significantly lowers the areal density. Another possible solution is to make the length of the write pole shorter in the direction along the tracks, which would decrease the negative effect of non-zero skew angle, but at the expense of significantly decreasing the write field. This would limit the ability of the writer to write on higher coercivity media.

The present invention provides a solution to the non-zero skew angle problem which does not require either decreasing the track pitch or any substantial modification of the overall write head design.

SUMMARY OF THE INVENTION

The present invention provides a perpendicular magnetic recording system which reduces or eliminates the skew angle effect. As used herein, the term "skew angle effect" means unwanted side writing onto previously recorded magnetic tracks caused by misalignment between the write pole and the recording tracks. The present recording system is particularly suitable for data storage applications where large blocks of information are stored and where small modifications in the stored data are not required. Significantly higher areal densities can be achieved since high track pitch can be utilized in this recording scheme. If the writing on the tracks is done in the order of incremental increase of the track numbers, i.e., the writing sequence is track n, track n+1, track n+2, etc., previously recorded adjacent tracks are not adversely affected. For instance, if track n+1 is recorded, track n is not adversely affected in accordance with the present invention. Consequently, when any particular track is recorded, other tracks are not affected, i.e., no track erasure due to non-zero skew angle will occur.

An aspect of the present invention is to provide a perpendicular magnetic recording system comprising a perpendicular magnetic recording disk including magnetic recording tracks, a perpendicular magnetic recording head including a perpendicular write pole movable in an arc across the perpendicular magnetic recording disk, and means for sequentially writing with the write pole onto adjacent magnetic recording tracks of the perpendicular magnetic recording disk to thereby substantially eliminate a skew angle effect.

Another aspect of the present invention is to provide a perpendicular magnetic recording system comprising a perpendicular magnetic recording disk including magnetic recording tracks, and a perpendicular magnetic recording head including a perpendicular write pole movable in an arc across the perpendicular magnetic recording disk, wherein the perpendicular write pole is aligned at compensation angles with respect to the magnetic recording tracks and the compensation angles remain greater than or equal to zero degrees when the write pole writes onto the magnetic recording tracks as the write pole moves in the arc across the magnetic recording tracks.

A further aspect of the present invention is to provide a method of magnetically recording data. The method includes the steps of providing a perpendicular magnetic recording disk including magnetic recording tracks, providing a perpendicular magnetic recording head including a perpendicular write pole movable in an arc across the perpendicular magnetic recording disk, and sequentially writing with the write pole onto adjacent magnetic recording tracks of the perpendicular magnetic recording disk to thereby substantially eliminate a skew angle effect.

These and other aspects of the present invention will be more apparent from the following description.

DETAILED DESCRIPTION

Figure 1:
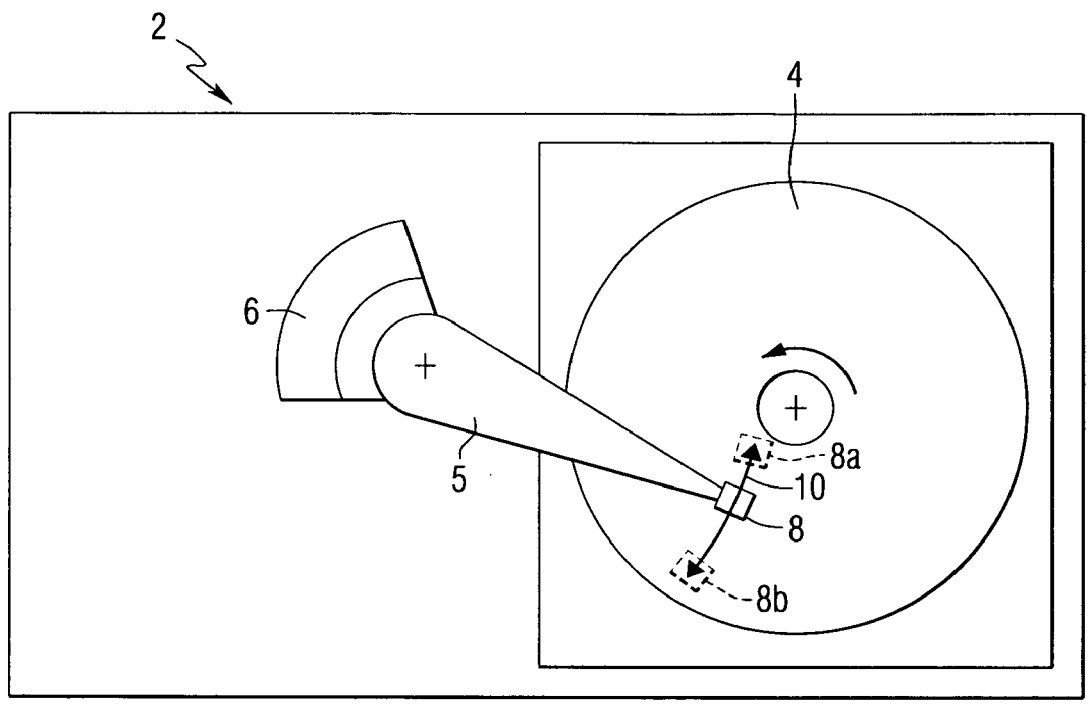
FIG. 1 is a partially schematic top view of a perpendicular magnetic recording disk drive, illustrating skew angles which result during recording operations.

FIG. 1 schematically illustrates a magnetic hard disk drive 2 including a rotatable magnetic disk 4. An actuator arm 5 is connected to a rotary actuator magnet and coil assembly 6. The magnetic hard disk drive 2 includes a magnetic recording head 8. During recording operations, the recording head 8 travels in an arc 10 between the positions 8a and 8b shown in phantom in FIG. 1. As the recording head 8 moves along the arc 10 over the disk 4, the head 8 is aligned parallel with the circumferential magnetic data tracks of the disk 4 at one location, but is slightly misaligned at a skew angle at other locations along the arc 10. For example, when the recording head 8 is positioned over the disk 4 at its radial innermost position 8a, the maximum skew angle is typically about −12 to −20 degrees. Similarly, when the recording head 8 is located over the disk 4 at the radial outermost position 8b, the maximum skew angle is typically about +12 to +20 degrees. This misalignment results in the skew angle effect which is a disadvantage of conventional magnetic recording designs.

Figure 2:
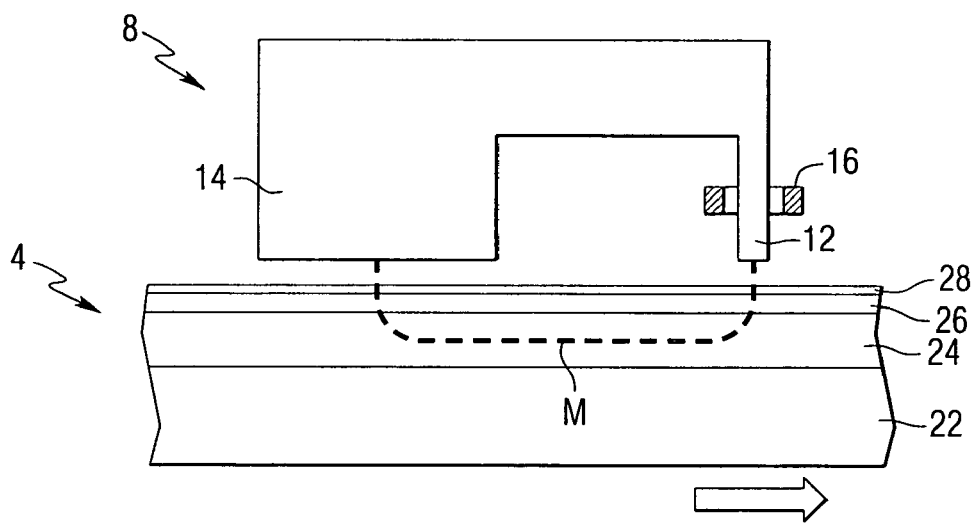
FIG. 2 is a partially schematic side sectional view of a perpendicular magnetic recording head and perpendicular magnetic recording disk.

FIG. 2 is a partially schematic side view of the conventional perpendicular magnetic recording head 8 positioned above the magnetic recording disk 4. The recording head 8 includes a trailing main write pole 12 and a leading return pole 14. A magnetizing coil 16 surrounds a yoke of the write pole 12. The disk 4 includes a substrate 22, a soft magnetic underlayer 24, a hard magnetic recording layer 26 and a protective layer 28. When current is passed through the coil 16, a magnetic field is generated which travels along a flux path M from the tip of the main pole 12 perpendicularly through the recording layer 26, across the soft underlayer 24 to the return pole 14. The soft underlayer 24 is thus used to provide a flux path between the main pole 12 and return pole 14.

Figure 3:
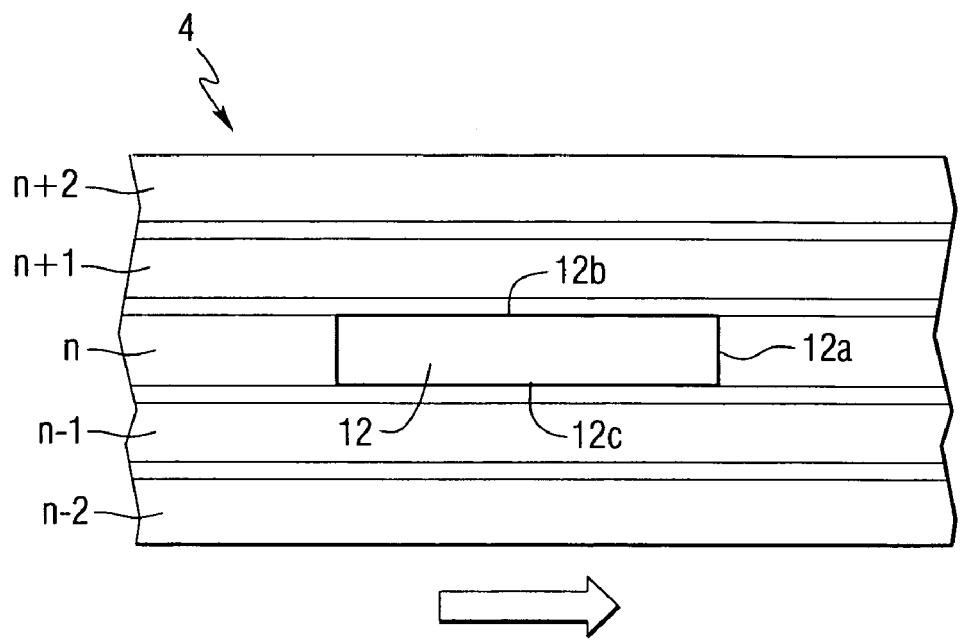
FIG. 3 is a partially schematic top view of a portion of a magnetic recording disk and an overlying perpendicular write pole aligned with the tracks of the disk, illustrating a zero skew angle.

FIG. 3 is a partially schematic top view of a portion of the magnetic recording disk 4, illustrating adjacent magnetic recording tracks n, n+1, n+2, etc. The position or footprint of the perpendicular write pole 12 in relation to the magnetic recording tracks of the disk 4 is also shown in FIG. 3. The write pole 12 includes a trailing edge 12a oriented perpendicularly with respect to the recording track n. The write pole 12 also includes side edges 12b and 12c aligned parallel with the recording track n. During the writing operation, the recording track n is written by the trailing edge 12a of the write pole 12 as the disk 4 moves in the direction of the arrow under the write pole. Since the side edges 12b and 12c of the write pole 12 are aligned parallel with the recording track n, and do not overlap the adjacent recording track n+1, the write pole 12 does not cause unwanted side writing of the adjacent track n+1 during the writing operation. However, due to the skew angle effect, the parallel alignment of the write pole 12 with the recording tracks of the disk 4 as shown in FIG. 3 is rarely achieved.

Figure 4:
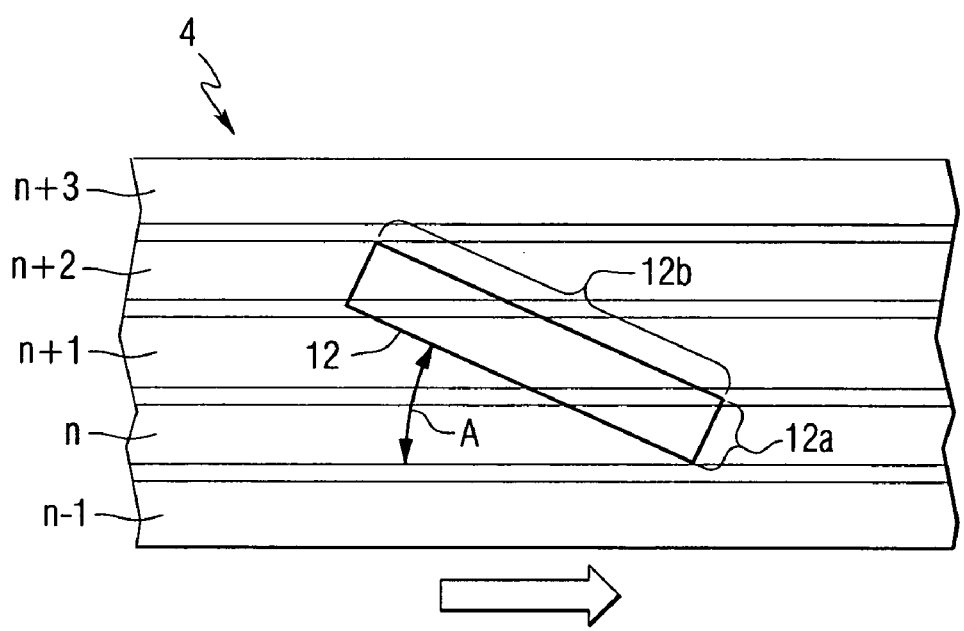
FIG. 4 is a partially schematic top view of a portion of a magnetic recording disk and an overlying perpendicular write pole aligned at a skew angle with respect to the tracks of the disk, illustrating side writing of adjacent hacks resulting from the skew angle.

FIG. 4 is a partially schematic top view of a portion of the magnetic recording disk 4 and the overlying perpendicular write pole 12 aligned at a skew angle A with respect to the tracks n, n+1, n+2, etc. of the disk 4. As shown in FIG. 4, due the skew angle A, not only does the trailing edge 12a of the write pole 12 write to track n of the disk 4, but the side edge 12b of the write pole 12 also writes to adjacent tracks, e.g., n+1 and n+2, during the writing operation. Unwanted side writing to the adjacent tracks n+1 and n+2, due to the skew angle A therefore occurs.

Figure 5:
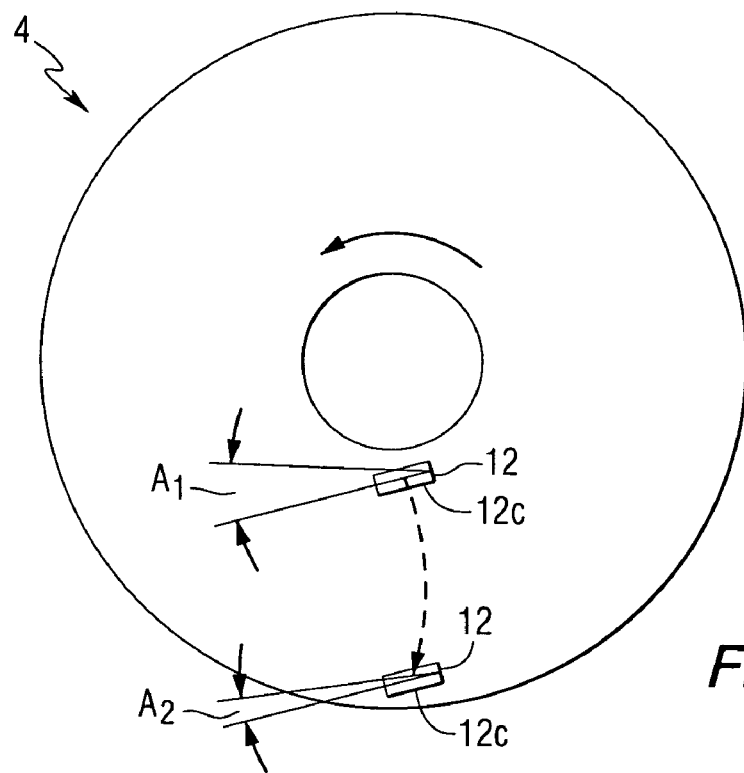
FIG. 5 is a top view of a magnetic recording disk schematically illustrating the outward radial travel of an angled perpendicular write pole in accordance with an embodiment of the present invention.

FIG. 5 is a top view of the magnetic recording disk 4, schematically illustrating the outward radial travel of the perpendicular magnetic write pole 12 across the disk 4. In accordance with the embodiment shown in FIG. 5, the write pole 12 is oriented at compensation angles $A_1$ and $A_2$ with respect to the recording tracks of the disk 4. Each compensation angle $A_1$ and $A_2$ is defined as the angle between the direction of the recording track and a line through the length of the write pole tip, measured from the trailing edge of the write pole. As the write pole 12 moves in an arc outwardly across the disk 4, the compensation angle $A_1$ at the radial innermost recording location of the disk 4 decreases to the compensation angle $A_2$ at the radial outermost recording location of the disk 4. Although the compensation angle $A_2$ is less than the angle $A_1$ it remains greater than or equal to zero, i.e., the compensation angle does not switch from positive to negative when then write pole 12 moves between the positions shown in FIG. 5. The write pole 12 serially writes to adjacent recording tracks as it moves radially outward across the disk 4. By maintaining the compensation angles $A_1$ and $A_2$ greater than zero, and by outwardly sequentially writing to adjacent recording tracks, any unwanted side writing by the side edge 12c of the write pole 12 is eliminated when the trailing edge 12a of the write pole 12 writes to the next adjacent track.

Figure 6:
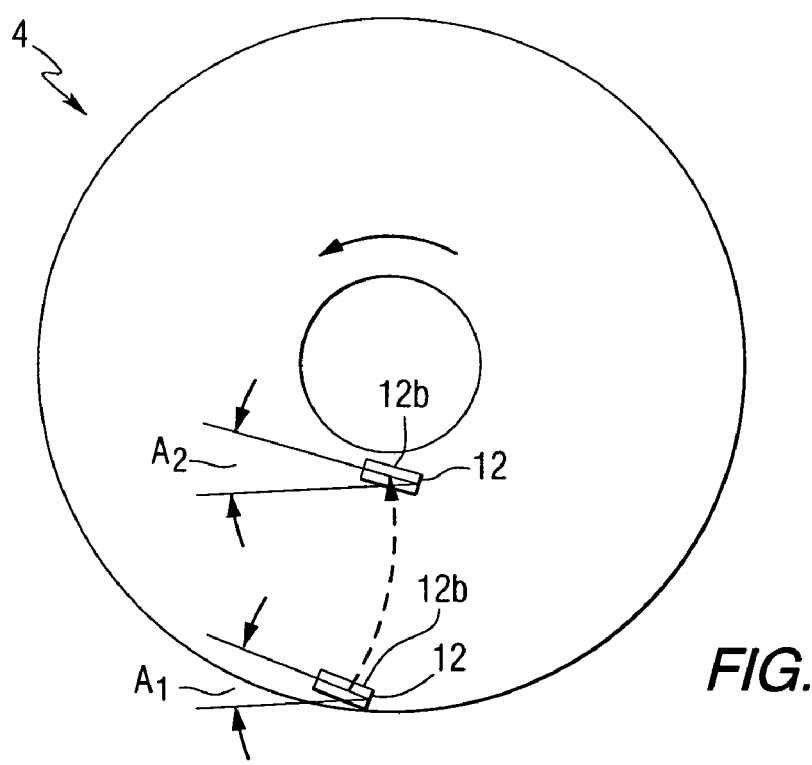
FIG. 6 is a top view of a magnetic recording disk schematically illustrating the inward radial travel of an angled perpendicular write pole in accordance with another embodiment of the present invention.

FIG. 6 is a top view of the magnetic recording disk 4, schematically illustrating the inward radial travel of the perpendicular magnetic write pole 12 across the disk 4 in accordance with another embodiment of the present invention. As shown in FIG. 6, the write pole 12 is oriented at compensation angles $A_1$ and $A_2$ with respect to the recording tracks of the disk 4. As the write pole 12 moves in an arc inwardly across the disk 4, the compensation angle $A_1$ at the radial outermost recording location of the disk 4 decreases to the compensation angle $A_2$ at the radial innermost recording location of the disk 4. The compensation angle $A_2$ is greater than or equal to zero, i.e., the compensation angle does not switch from positive to negative when the write pole 12 moves between the positions shown in FIG. 6.

In the embodiments shown in FIGS. 5 and 6, the smallest compensation angle, $A_2$, is greater than or equal to zero degrees, typically greater than 1 degree. For example, the compensation angle $A_2$ may range from about 2 to about 6 degrees. The larger compensation angle, $A_1$, shown in FIGS. 5 and 6, typically ranges from about 5 to about 15 degrees, for example, from about 6 to about 12 degrees. However, these angles may vary depending on the particular hard drive design, e.g., media diameter, suspension arm dimensions, relative position of the arm with respect to the media, etc.

Figure 7:
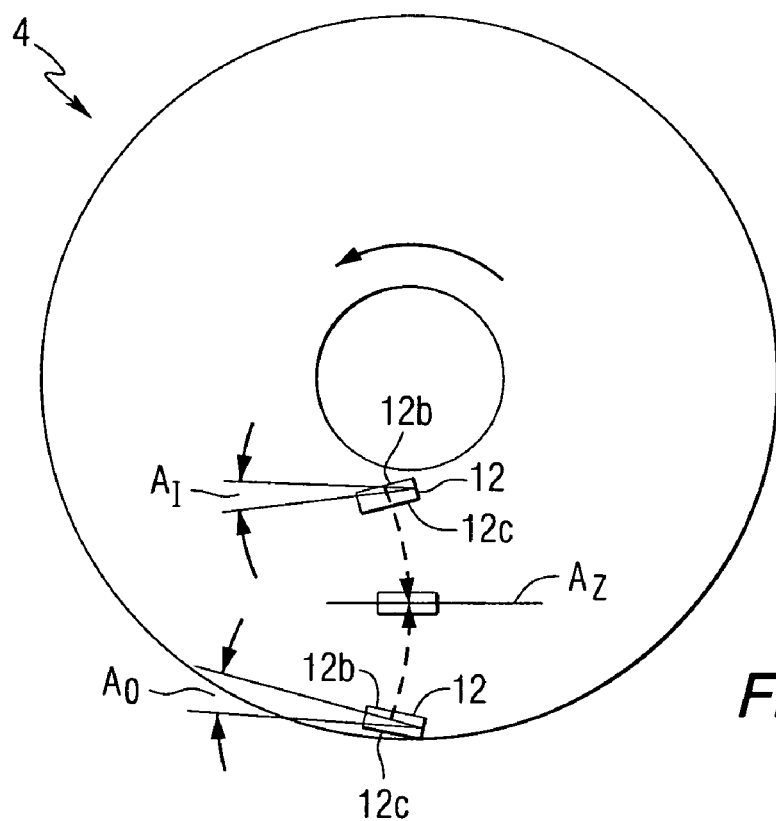
FIG. 7 is a top view of a magnetic recording disk schematically illustrating outward radial travel of a perpendicular write pole over a portion of the disk and inward radial travel of the write pole over another portion of the disk in accordance with a further embodiment of the present invention.

FIG. 7 is a top view of the magnetic recording disk 4 in accordance with a further embodiment of the present invention, schematically illustrating outward radial travel of the perpendicular write pole 12 over a portion of the disk 12, and inward radial travel of the write pole 12 over another portion of the disk 12. In accordance with the embodiment shown in FIG. 7, the write pole 12 is oriented at compensation angles $A_I$, $A_O$ and $A_Z$ with respect to the recording tracks of the disk 4, depending upon the position of the write pole 12 in relation to the disk 4. As the write pole 12 moves in an arc outwardly across the interior portion of the disk 4, the compensation angle $A_I$ at the radial innermost recording location of the disk 4 decreases to the zero compensation angle $A_Z$. Alternatively, as the write pole 12 moves in an arc inwardly across the exterior portion of the disk 4, the compensation angle $A_O$ at the radial outermost recording location of the disk 4 decreases to the zero compensation angle $A_Z$. In the embodiment shown in FIG. 7, the zero compensation angle $A_Z$ occurs approximately mid-way between the radial innermost and radial outermost recording locations of the disk 4. However, the zero compensation angle $A_Z$ may alternatively occur at any other radial location between the compensation angles $A_I$ and $A_O$.

In accordance with the embodiment shown in FIG. 7, by outwardly sequentially writing to adjacent recording tracks in the region defined by the compensation angles $A_I$ and $A_Z$, and by inwardly sequentially writing to adjacent recording tracks of the disk 4 in the region of the disk 4 defined by the compensation angles $A_O$ and $A_Z$, any unwanted side writing by the side edges 12b and 12c is eliminated when the trailing edge of the write pole 12 writes to the next adjacent track.

In the embodiment shown in FIG. 7, the inner angle $A_I$ typically ranges from about 3 to about 8 degrees, for example, from about 4 to about 6 degrees. The outer angle $A_O$ typically ranges from about 3 to about 8 degrees, for instance, from about 4 to about 6 degrees.

In accordance with an embodiment of the present invention, a write pole 12 having a relatively high aspect ratio may be used while avoiding the increased skew angle effect which could otherwise result from the use of a high aspect ratio write pole. The aspect ratio of the write pole 12 is defined by the length of the side edges 12b and 12c of the write pole versus the trailing edge 12a of the write pole. The aspect ratio of the write pole may be greater than 1:1, typically greater than 2:1 or 3:1. For example, the write pole aspect ratio may be from about 5:1 to about 10:1. High aspect ratio write poles may be advantageous in perpendicular magnetic recording designs in order to minimize the track width written by the trailing edge of the write pole, while providing a sufficiently large cross-sectional area of the write pole which allows a sufficient amount of magnetic flux to pass through the write pole tip to provide the desired write field. However, when such large aspect ratio write pole designs are used in conventional perpendicular magnetic recording systems, the relatively long side edges of the write pole amplify the skew angle effect by extending greater distances over adjacent tracks of the disk at non-zero skew angles. In accordance with the present invention, the skew angle effect is eliminated even with large aspect ratio write poles.

In the embodiments shown in FIGS. 3–7, the write pole 12 has a rectangular cross section. Such a rectangular write pole cross section may be desired in order to simplify fabrication of the recording head or to provide the desired writing characteristics. However, other write pole shapes may be used. For example, one or both side edges of the write pole may be tapered or curved, or other shapes may be employed.

In accordance with an embodiment of the present invention, the tracks may be separated into recording blocks. A single writing event may record a complete block of tracks. The size of the block of tracks depends on the skew angle, and it can be made variable across the disk.

Figure 8:
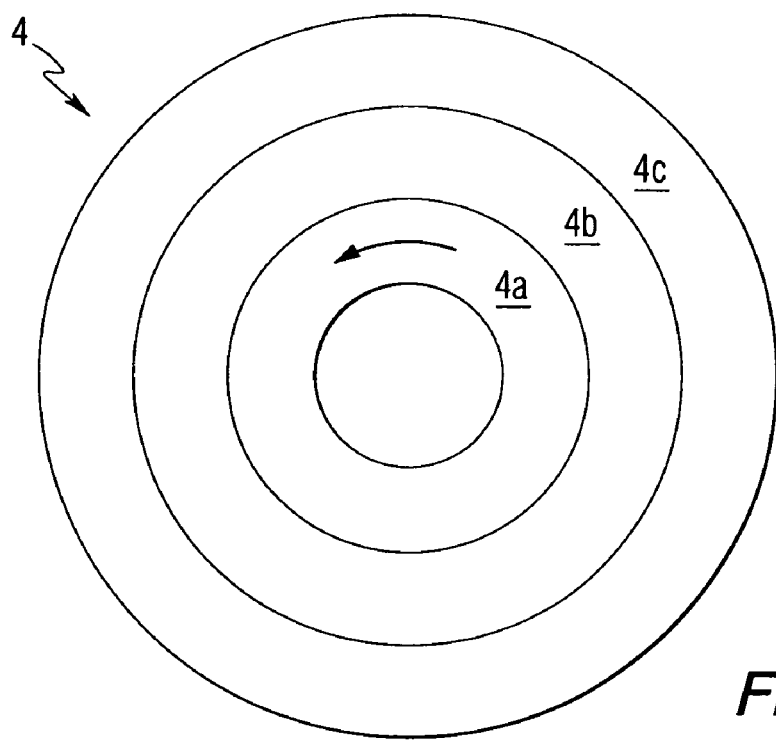
FIG. 8 is a top view of a magnetic recording disk segmented into concentric recording blocks in accordance with an embodiment of the present invention.

FIG. 8 is a top view of the magnetic recording disk 4 segmented into separate recording blocks 4a, 4b and 4c in accordance with an embodiment of the present invention. Each recording block 4a, 4b and 4c may be separately written to during separate recording operations. Although three concentric recording blocks 4a, 4b and 4c are shown in FIG. 8, more or less recording blocks may be used. For example, up to 10 recording blocks may be separately written. Each recording block 4a, 4b and 4c shown in FIG. 8 includes multiple magnetic recording tracks. For example, each recording block 4a, 4b and 4c may typically include from about 10 to about 100 or more recording tracks. In accordance with the present invention, the recording tracks may be provided in the form of discrete concentric rings. Alternatively, the recording track may be provided in the form of a continuous spiral. The size of the recording block does not have to be fixed. For example, it is possible to implement a servo algorithm that will change the number of tracks in a block depending on the skew angle value over the block.

In accordance with an aspect of the present invention, sequential writing to adjacent recording tracks may be accomplished through the use of a sequential writing algorithm. The algorithm may be provided in the form of software in an operating system that controls the writing in a hard drive system, or may be encoded directly into the hard drive hardware. Sequential writing to adjacent tracks in accordance with the present invention may also be accomplished through the use of guide information provided on the perpendicular magnetic recording media. The guide information may be provided in the form of servo marks which facilitate the determination of the location of the head. Also, the servo marks may enable the skew angle to be determined, as well as the size of a particular recording block at a particular location on the media.

Whereas particular embodiments of this invention have been described above for purposes of illustration, it will be evident to those skilled in the art that numerous variations of the details of the present invention may be made without departing from the invention as defined in the appended claims.

What is claimed is:

1. A perpendicular magnetic recording system comprising:

a perpendicular magnetic recording disk including magnetic recording tracks;

a perpendicular magnetic recording head including a perpendicular write pole movable in an arc across the perpendicular magnetic recording disk; and means for moving the write pole radially outward across at least a portion of the disk for sequentially writing with the write pole onto adjacent magnetic recording tracks of the perpendicular magnetic recording disk to thereby substantially eliminate a skew angle effect; and wherein the write pole is aligned at a first compensation angle $A_1$ with respect to the magnetic recording tracks when the write pole is located over an inward portion of the disk, the write pole is aligned at a second compensation angle $A_2$ with respect to the magnetic recording tracks when the write pole is located over an outward portion of the disk, the first compensation angle $A_1$ is from about 5 to about 15 degrees, and the second compensation angle $A_2$ is greater than about 1 degree.

2. The perpendicular magnetic recording system of claim 1, wherein the first compensation angle $A_1$ is from about 6 to about 12 degrees, and the second compensation angle $A_2$ is from about 2 to about 6 degrees.

3. The perpendicular magnetic recording system of claim 1, wherein the means for moving the write pole radially outward across at least a portion of the disk comprises an actuator arm.

4. The perpendicular magnetic recording system of claim 1, wherein the write pole is moved radially inward across substantially all of the magnetic recording tracks of the disk during the sequential writing.

5. A perpendicular magnetic recording system comprising:
- a perpendicular magnetic recording disk including magnetic recording tracks;
- a perpendicular magnetic recording head including a perpendicular write pole movable in an arc across the perpendicular magnetic recording disk; and
- means for moving the write pole radially inward across at least a portion of the disk for sequentially writing with the write pole onto adjacent magnetic recording tracks of the perpendicular magnetic recording disk to thereby substantially eliminate a skew angle effect; and
- wherein the write pole is aligned at a first compensation angle $A_1$ with respect to the magnetic recording tracks when the write pole is located over an outward portion of the disk, the write pole is aligned at a second compensation angle $A_2$ with respect to the magnetic recording tracks when the write pole is located over an inward portion of the disk, the first compensation angle $A_1$ is from about 5 to about 15 degrees, and the second compensation angle $A_2$ is greater than about 1 degree.

6. The perpendicular magnetic recording system of claim 5, wherein the first compensation angle $A_1$ is from about 6 to about 12 degrees, and the second compensation angle $A_2$ is from about 2 to about 6 degrees.

7. The perpendicular magnetic recording system of claim 5, wherein the means for moving the write pole radially inward across a portion of the disk and moving the write pole radially inward across another portion of the disk comprises an actuator arm.

8. A perpendicular magnetic recording system comprising:
- a perpendicular magnetic recording disk including magnetic recording tracks; and
- a perpendicular magnetic recording head including a perpendicular write pole movable in an arc across the perpendicular magnetic recording disk, wherein the perpendicular write pole has a trailing edge and a side edge, the side edge is aligned at compensation angles with respect to the magnetic recording tracks, and the compensation angles remain greater than or equal to zero degrees when the write pole writes onto the magnetic recording tracks as the write pole moves in the arc across the magnetic recording tracks;
- wherein the side edge of the write pole is aligned at a first compensation angle $A_1$ with respect to the magnetic recording tracks when the write pole is located over an inward portion of the disk, the side edge of the write pole is aligned at a second compensation angle $A_2$ with respect to the magnetic recording tracks when the write pole is located over an outward portion of the disk, the first compensation angle $A_1$ is from about 5 to about 15 degrees, and the second compensation angle $A_2$ is greater than about 1 degree.

9. The perpendicular magnetic recording system of claim 8, wherein the first compensation angle $A_1$ is from about 6 to about 12 degrees, and the second compensation angle $A_2$ is from about 2 to about 6 degrees.

10. A perpendicular magnetic recording system comprising:
- a perpendicular magnetic recording disk including magnetic recording tracks; and
- a perpendicular magnetic recording head including a perpendicular write pole movable in an arc across the perpendicular magnetic recording disk, wherein the perpendicular write pole has a trailing edge and a side edge, the side edge is aligned at compensation angles with respect to the magnetic recording tracks, and the compensation angles remain greater than or equal to zero degrees when the write pole writes onto the magnetic recording tracks as the write pole moves in the arc across the magnetic recording tracks;
- wherein the side edge of the write pole is aligned at a first compensation angle $A_1$ with respect to the magnetic recording tracks when the write pole is located over an outward portion of the disk, the side edge of the write pole is aligned at a second compensation angle $A_2$ with respect to the magnetic recording tracks when the write pole is located over an inward portion of the disk, the first compensation angle $A_1$ is from about 5 to about 15 degrees, and the second compensation angle $A_2$ is greater than about 1 degree.

11. The perpendicular magnetic recording system of claim 10, wherein the first compensation angle $A_1$ is from about 6 to about 12 degrees, and the second compensation angle $A_2$ is from about 2 to about 6 degrees.

* * * * *